United States Patent
Rakshit et al.

(10) Patent No.: US 11,762,864 B2
(45) Date of Patent: Sep. 19, 2023

(54) CHAT SESSION EXTERNAL CONTENT RECOMMENDER

(71) Applicant: KYNDRYL, INC., New York, NY (US)

(72) Inventors: Sarbajit K. Rakshit, Kolkata (IN); John M. Ganci, Jr., Raleigh, NC (US); Martin G. Keen, Cary, NC (US); James E. Bostick, Cedar Park, TX (US)

(73) Assignee: KYNDRYL, INC., New York, NY (US)

( * ) Notice: Subject to any disclaimer, the term of this patent is extended or adjusted under 35 U.S.C. 154(b) by 1359 days.

(21) Appl. No.: 16/176,393

(22) Filed: Oct. 31, 2018

(65) Prior Publication Data

US 2020/0134035 A1    Apr. 30, 2020

(51) Int. Cl.
*G06F 16/00* (2019.01)
*G06F 16/2457* (2019.01)
*G06F 16/2455* (2019.01)
*H04L 51/216* (2022.01)

(52) U.S. Cl.
CPC .... *G06F 16/24578* (2019.01); *G06F 16/2455* (2019.01); *H04L 51/216* (2022.05)

(58) Field of Classification Search
CPC combination set(s) only.
See application file for complete search history.

(56) References Cited

U.S. PATENT DOCUMENTS

| 9,177,347 | B2 | 11/2015 | Jackson et al. |
| 9,467,411 | B2 | 10/2016 | Albouyeh et al. |
| 9,883,358 | B2 | 1/2018 | Kalkounis et al. |
| 9,986,391 | B2 | 5/2018 | Cho |
| 10,078,673 | B2 * | 9/2018 | Nagel ................. G06F 3/04886 |
| 2015/0058332 | A1 | 2/2015 | Patterson et al. |
| 2016/0148227 | A1 * | 5/2016 | Choe ................. G06F 16/24575 705/7.31 |
| 2016/0308794 | A1 | 10/2016 | Kim et al. |
| 2017/0060841 | A1 * | 3/2017 | Smyros ................. G06F 40/253 |

(Continued)

OTHER PUBLICATIONS

Peter Mell et al, The NIST Definition of Cloud Computing, National Institute of Standards and Technology, Publication 800-145, 2011, entire document.

*Primary Examiner* — Farhan M Syed

(74) *Attorney, Agent, or Firm* — Erik Swanson; Andrew M. Calderon; Calderon Safran & Cole, P.C.

(57) ABSTRACT

Aspects of the present invention provide devices that identify a question in a text message of a chat session between a plurality of computing devices, wherein each of the plurality of computing devices includes an identifier of a user of a corresponding computing device in the text message, analyze digital data to determine a relationship between the users of the plurality of computing devices, construct search parameters for digital content external to the chat session according to the identified question and determined relationship, search for the digital content over a network according to the constructed search parameters to obtain search results, rank the search results according to the determined relationship, and distribute the ranked search results according to the determined relationship to at least one of the plurality of computing devices in an overlay of the chat session.

18 Claims, 5 Drawing Sheets

(56) References Cited

U.S. PATENT DOCUMENTS

| | | | |
|---|---|---|---|
| 2017/0060847 A1* | 3/2017 | Allen | G06F 40/253 |
| 2017/0180276 A1 | 6/2017 | Gershony et al. | |
| 2017/0308587 A1* | 10/2017 | Nagel | G06F 3/04886 |
| 2018/0101590 A1* | 4/2018 | Bastide | G06F 16/2455 |
| 2018/0101595 A1* | 4/2018 | Bastide | G06Q 50/01 |
| 2020/0301934 A1* | 9/2020 | Choe | G06Q 30/0202 |
| 2021/0182301 A1* | 6/2021 | Motte | G06F 16/285 |

* cited by examiner

CHAT SESSION EXTERNAL CONTENT RECOMMENDER

BACKGROUND

The field of computing includes real-time transmission of text messages between computing devices and the display of exchanged real-time text messages on the computing devices.

Online chat is the real-time transmission of the text messages between a sending device and one or more receiving computing devices, such as smartphones. The exchange of the text messages by the computing devices form a chat session.

User interfaces are typically organized to display each exchanged text message and an identifier of the user sending a corresponding text message. The displayed text messages are displayed chronologically as they are received. Scrolling capabilities allow users of the devices to scroll through past text messages, typically using a swipe gesture. The user interface includes entry of the text messages, typically via a keyboard, virtual or otherwise.

Some online chat session user interfaces have added entry, transmission and display of objects in addition to the entered text, such as charts, graphs, photographs, videos, etc., generated by other applications and selected by a user to include in the exchanged message. The object is typically displayed in line with the text as an icon, a miniaturized display, or a link. Selecting the object icon, miniaturized display, or link can expand to a pop-up view of the object.

Some online chat session user interfaces have added predicted words or responses based on prior text in the chat session. For example, the chat application provides a list of predicted next words as the user types characters. In some instances, words are predicted based on prior history for the chat session and/or user.

BRIEF SUMMARY

In one aspect of the present invention, a computer-implemented method for generating chat session content includes executing a computer processor identifying a question in a text message of a chat session between a plurality of computing devices, wherein each of the plurality of computing devices includes an identifier of a user of a corresponding computing device in the text message; analyzing digital data to determine a relationship between the users of the plurality of computing devices; constructing search parameters for digital content external to the chat session according to the identified question and determined relationship; searching for the digital content over a network according to the constructed search parameters to obtain search results; ranking the search results according to the determined relationship; and distributing the ranked search results according to the determined relationship to at least one of the plurality of computing devices in an overlay of the chat session.

In another aspect, a system has a hardware computer processor, computer readable memory in circuit communication with the computer processor, and a computer-readable storage medium in circuit communication with the computer processor and having program instructions stored thereon. The computer processor executes the program instructions stored on the computer-readable storage medium via the computer readable memory and thereby generates chat session content, which identifies a question in a text message of a chat session between a plurality of computing devices, wherein each of the plurality of computing devices includes an identifier of a user of a corresponding computing device in the text message, analyzes digital data to determine a relationship between the users of the plurality of computing devices, constructs search parameters for digital content external to the chat session according to the identified question and determined relationship, searches for the digital content over a network according to the constructed search parameters to obtain search results, ranks the search results according to the determined relationship, and distributes the ranked search results according to the determined relationship to at least one of the plurality of computing devices in an overlay of the chat session.

In another aspect, a computer program product for generating chat session content has a computer-readable storage medium with computer readable program code embodied therewith. The computer readable program code includes instructions for execution by a computer processor that cause the first computer processor to identify a question in a text message of a chat session between a plurality of computing devices, wherein each of the plurality of computing devices includes an identifier of a user of a corresponding computing device in the text message, analyze digital data to determine a relationship between the users of the plurality of computing devices, construct search parameters for digital content external to the chat session according to the identified question and determined relationship, search for the digital content over a network according to the constructed search parameters to obtain search results, rank the search results according to the determined relationship, and distribute the ranked search results according to the determined relationship to at least one of the plurality of computing devices in an overlay of the chat session.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
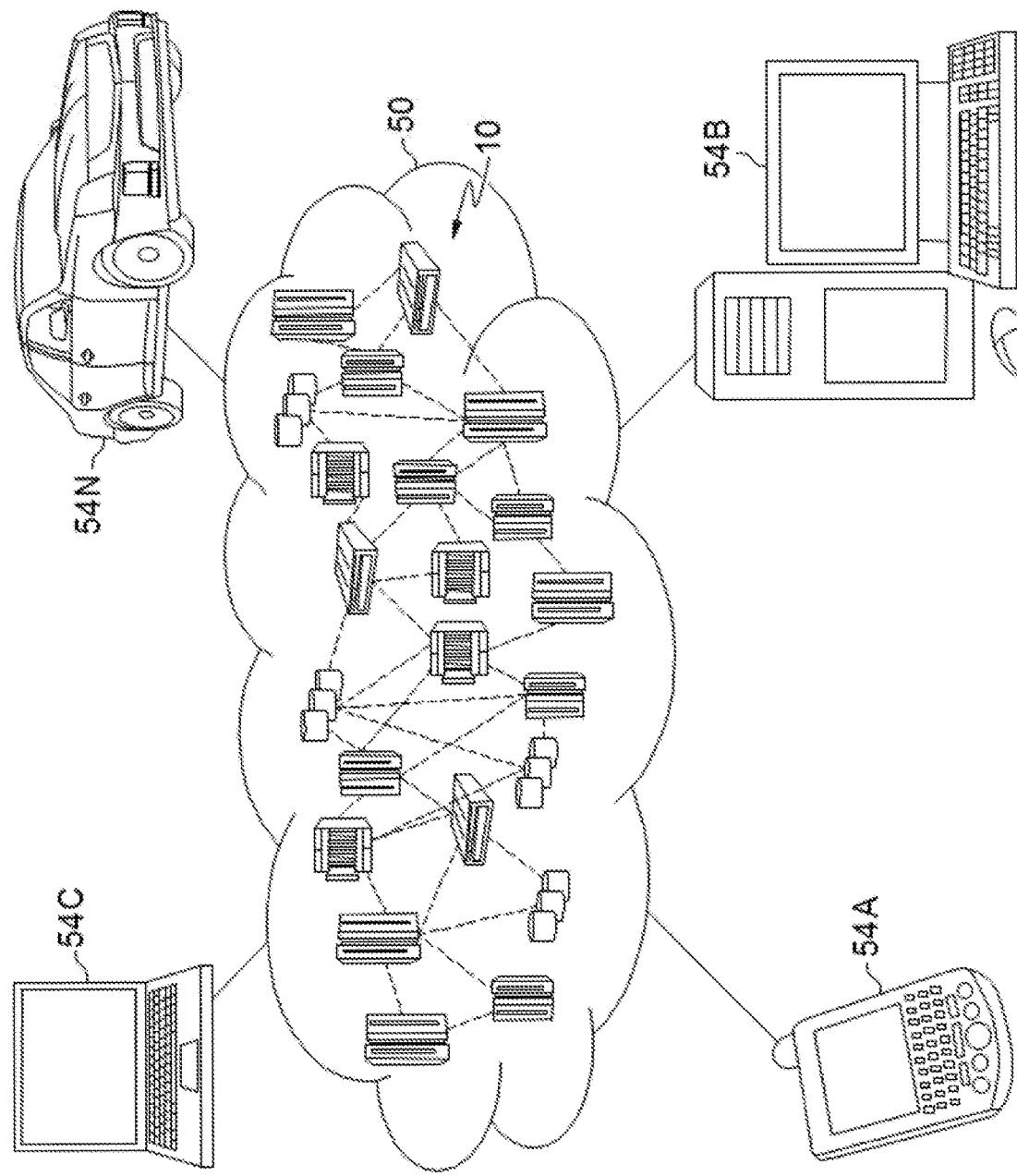
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
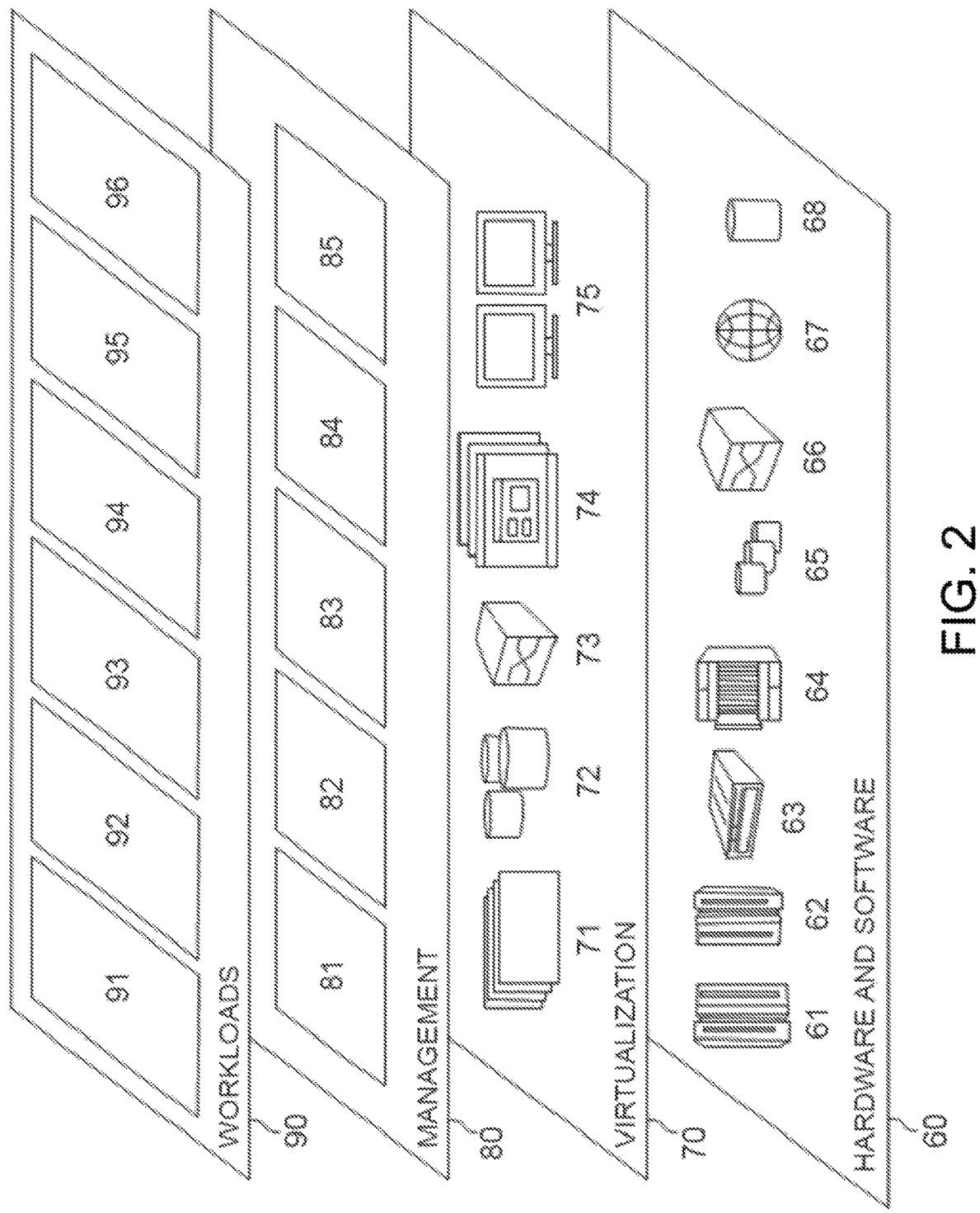
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for generating chat session content 96.

Figure 3:
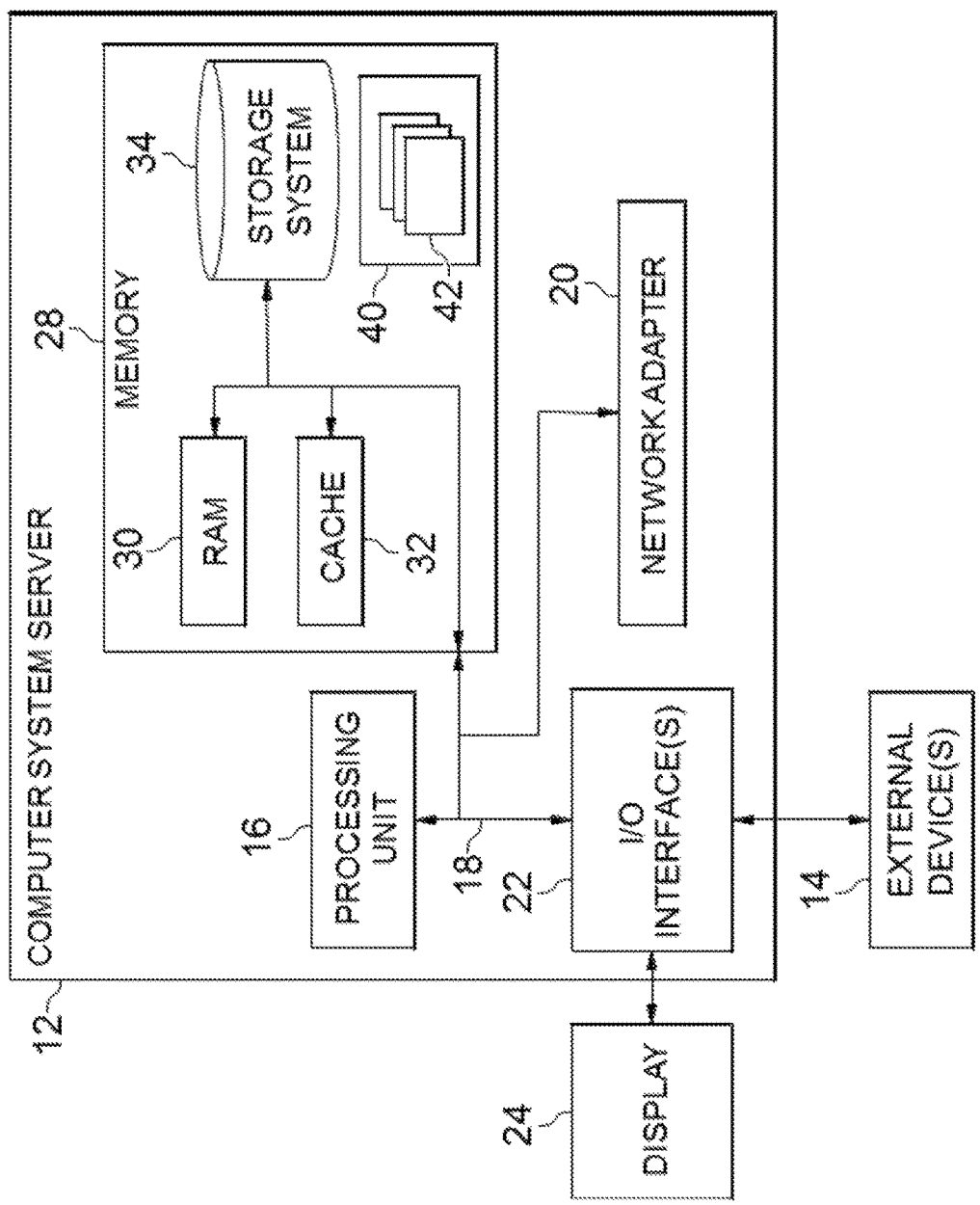
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
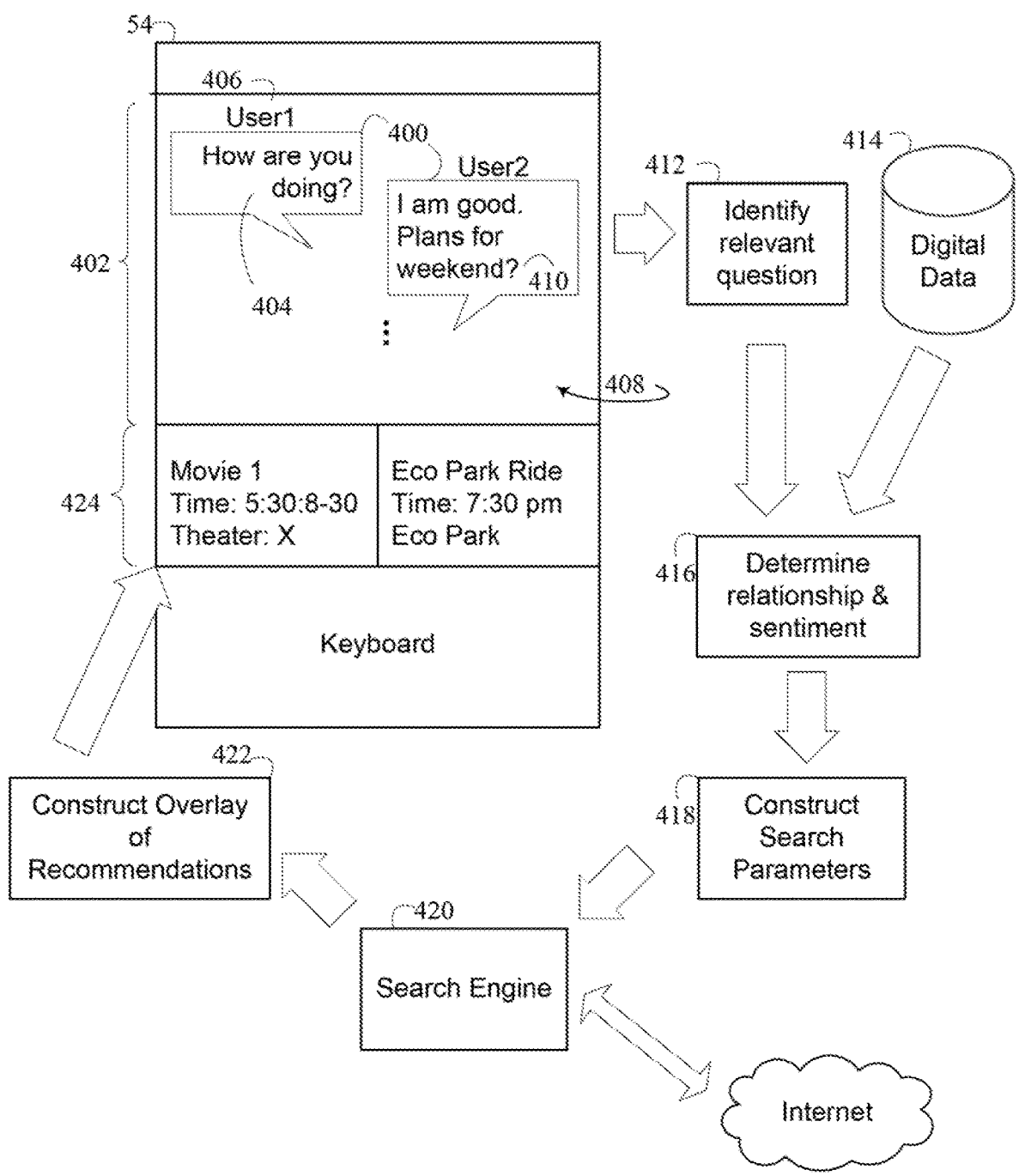
FIG. 4 depicts an example schematic illustration of an embodiment of the present invention.

FIG. 4 schematically illustrates an example according to the present invention for generating chat session content. A configured processor, such as the processing unit 16 of the computer system/server 12, as described in reference to FIG. 3, receives text messages 400 in real-time within a chat session 402. In some embodiments, the configured processor can also include a suitably configured processor on the local computing device 54, such as with an application plug-in.

Each text message 400 includes text 404 and an identifier 406, such as a name, phone number, email address, or description of an entity or a user operating the local computing device 54 or an identifier of the sending local computing device 54. Each text message 400 includes a time stamp, which can be displayed as a time, date and time, day of the week and time, day of the week, etc., in the chat session. The text messages 400 of the chat session 402 are displayed on a display device of each local computing device 54 as the text messages 400 are received. The display device, such as the display 24 described in reference to FIG. 3, includes a user interface with a window 408 that displays each message 400 chronologically in real-time as each text message 400 is received.

At 412, the configured processor uses natural language processing to identify a question 410 in the chat session 402. The question 410 can be filtered for relevancy. Relevant questions include questions concerning events, activities, products or services. For example, a first illustrated question of "how are you doing?" is not relevant to an event, an activity, a product or a service. However, a second illustrated question of "plans for the weekend?" is relevant to events, activities, or services, such as watching a movie at a theater, participating in a park ride, etc. The question can be identified by natural language processing and further enhanced by context of the chat session 402, and other digital information. For example, specific dates can be determined for "this weekend" using time stamps of the messages and a calendar.

At 416, the configured processor analyzes digital data 414 using a model to determine a relationship and relationship strength between the users in the chat session 402. The relationship and relationship strength can be determined from the digital data 414, such as text messages in the chat session, text messages in prior chat sessions, biometric data, calendar data, social media data, and combinations thereof. For example, social media can provide relationship information in coded fields, or analysis of digital data within the social media data, such as discussion data, labeled image data, etc. The data from chat sessions can provide relationship information in text messages according to how one person addresses or converses with another, such as "My friend", "How is my daughter doing?", "with love, Mom", etc.

The relationship can include friends, acquaintances, work associates, familial relationships, and combinations thereof. The familial relationships can be spouses, parent-child, siblings, and extended family. The relationships can be general, such as parent-child, employer-employee or more specific, such as in father-son, mother-daughter, father-daughter, mother-son, manager-worker, co-worker, etc.

The relationship strength can be a relative measurement. For example, the strength of the bond in the interpersonal relationship can be on a relative numerical scale, such as 1 for a weakest bond and 10 for a strongest bond. The relationship strength can be indicated as a value between pairs of the users or as a value for each participating member in the chat session 402.

In some embodiments, the relationship strength identifies a decision maker from within the users participating in the chat session 402. For example, in a chat session between a father and daughter, text messages of prior chat sessions indicate the daughter as typically deciding a shared activity.

The determination of the relationship and strength can include a sentiment analysis of the chat session 402. For example, the sentiment of the relevant question 410 can include a polarity classification, such as positive, negative or neutral. The sentiment can include an emotion classification, such as anger, sadness, happiness, fear, joy, disgust, surprise, trust, and anticipation.

The model can include deep learning models, support vector machines, Bayesian networks, neural networks, linear regression models, long short term memory (LSTM), and the like. The model can be trained using a collection of chat sessions and resulting events, activities, products or services. The model learns that an activity, event, product or service is normally selected based on the identified relevant question, the determined relationship and relationship strength, and in some embodiments, the classified sentiment.

The model can include determining a personality and interest of the user from social media data. The personality and interests can identify preferences for types of events, activities, products and services.

The model can include determining a current state of mind for the user from biometric data, such as data obtained from a smartwatch, a camera, a microphone, and the like. For example, the smartwatch can provide heart rate data indicative of a magnitude of emotion, the camera can provide facial expressions indicative of an emotion, the microphone can provide voice tone indicative of emotion, etc.

For example, in the chat session 402 between a father, who prefers adventures and thrillers, and a daughter, who prefers romantic comedies and thrillers, when both attend a movie together, they see a romantic comedy that is selected by the daughter. The sentiment can indicate a difference in the type of activity, event, product or service. For example, when the daughter is sad, a romantic comedy with a strong female lead is selected, and when joyous, a romantic comedy with a strong male lead is selected. In another example, two friends often discuss clothing products that one of the friends often purchases based on the opinion of the other friend. In another example, the questions of "plans for the weekend?" can include be refined based on a calendar, which indicates a birthday for one of the users, or a weather report, which indicates a fair-weather weekend.

At 418, the configured processor constructs search parameters for digital content external to the chat session 402. The search parameters can be constructed with output from the model. For example, the question inquires about a product, which is a shoe. The chat discussion includes a type of shoe and prior history indicates preferences for a particular brand of shoe. The constructed search parameters include the shoe type and the preferred brand name.

The search parameters can be refined with the sentiment analysis and other analysis, such as the user personality and interests, the user state of mind, historical data of events, activities, products and services, and combinations thereof. For example, the search parameters can include inclusion parameters, such as preferred activities, events, products or services, exclusion parameters, such as avoided activities, events, services or products, and combinations thereof. In some embodiments, the search parameters include Boolean logic. In some embodiments, the search parameters include a plurality of sets of search parameters. For example, in the question of weekend plans, a forecast of rain on Friday night includes search parameters for a movie, and with a forecast of sunny skies on Saturday, search parameters for an outdoor activity. The search parameters can be refined, such as with regard to travel distance, expense limitations, physical requirements, and combinations thereof. The refinement of search parameters is based on analysis of the digital data 414, which can provide prior distances traveled, prior expenses, prior physical requirements, etc.

At 420, the configured processor submits a search with the constructed search parameters to a search engine, which searches external content and returns search results. The external content search can include an Internet search, an intranet search, a specific domain search, and the like. The search can include Boolean logic, multiple searches and combinations thereof.

At 422, the configured processor constructs one or more overlays 424 of recommendations from the search results. Each recommendation identifies a specific event, activity, product or service from the search results. The recommendations can be ranked according to the determined relationship. The determined relationship can include preferences of the decision maker and the strength of the determined relationship. For example, in the father-daughter movie example above, the results can include ranking of romantic comedies according to the shared preferences, followed by preferences of the daughter, followed by preferences of the father. In some embodiments, each overlay includes a set of recommendations ranking the search results specific to each user, such as according to the shared preferences, the user specific preferences, the strength of the determined relationship and combinations thereof. Each recommendation identifies at least one activity, event, product or service and includes at least one attribute of the identified activity, event, product or service obtained from the search results, i.e. content obtained external to the chat session with parameters determined from the content of the chat session. The attributes can include a name, a time, a location, a supplier, a cost, and combinations thereof.

The configured processor sends the overlay 424 to a user interface of the local computing device 54, such as the decision maker. In some embodiments, the overlay is sent to the user interface of each local computing device 54 participating in the chat session 402. In some embodiments, the overlay 54 includes a plurality of overlays, each including recommendations specifically ranked according to the user, and each sent to the corresponding local computing device 54. The overlay can include scrolling capabilities for a range of recommendations.

The overlay 424 can include a specific portion of the user interface of the chat application or a pop-up window. In some embodiments, the overlay 54 can include links, which link to further external content, such as a hyperlink to a specific URL, a further refined search specific to a corresponding recommendation, and the like.

The present invention provides improvements to chat sessions over conventional chat sessions, which predict words based on entered text. The improvements include providing recommendations of external content generated from a network based search using content of the chat session. Furthermore, the search parameters can be refined using the sentiment analysis or other analysis, which provides an improvement over conventional search practice.

Figure 5:
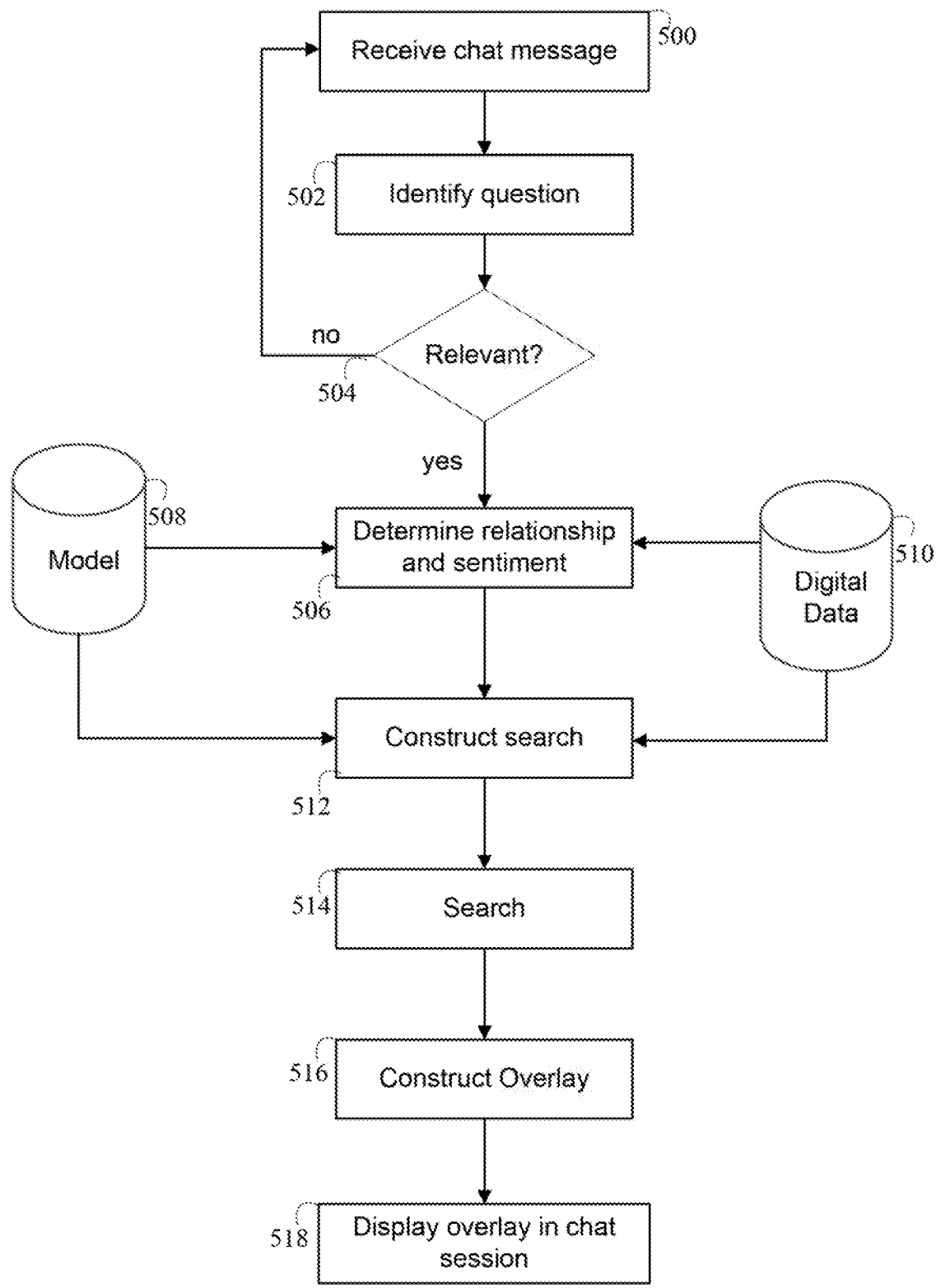
FIG. 5 is a flow chart illustration of an embodiment of the present invention.

FIG. 5 illustrates one embodiment of a method according to the present invention for generating chat session content. At 500, the configured processor receives the text message 400 in the chat session 402, and the text message 400 is identified by a user identifier. The chat session 402 includes the text messages 400 exchanged by computing devices, such as the local computing devices 54.

At 502, the configured processor identifies a question for the received text message 400 using natural language processing.

At 504, the configured processor determines whether the question is a relevant question 410. The relevant question 410 is a question about activities, events, products or services. If no relevant question is found or if the text message 400 includes no question, then processing resumes at 500 while receiving another text message 400.

At 506, the configured processor, in response to determining the relevant question 410, analyzes content of the identified question 410 and digital data 510, such as the chat session 402, using a model 508 to determine a relationship and relationship strength between the users participating in the chat session 402. The analysis can include a sentiment analysis, analysis of user personality and interests, analysis of user current state of mind, and combinations thereof.

The model 510, such as a deep learning model, support vector machines, Bayesian networks, neural networks, linear regression models, long short term memory (LSTM), and the like, receives and inputs the relevant question 410, the text messages 400 of the chat session 402, analyzes the content, and outputs data indicative of search parameters. The digital data 510 and inputs can include social media data, text messages of other chat sessions, biometric data, calendar data, and combinations thereof. The sentiment analysis, the analysis of personality and interests, and the analysis of current state of mind can be used by the model 508 to refine the output indicative of the search parameters. The output can include output indicative of a plurality of sets of search parameters. In some embodiments, the output indicative of a set of search parameters includes a corresponding user identifier for a set. The output can include a user identity of a decision maker. In some embodiments, the output indicative of sets of search parameters includes a plurality of searches and the user identifier is omitted. Combinations of the above are contemplated.

At 512, the configured processor constructs a search for digital content external to the chat session 402. The search construction includes constructing and formatting search parameters from the output of the model 508. For example, the model 508 outputs the following: "user X", "umbrella", "red", and "local purchase." The external search includes constructing a search string with formatting for a search red umbrellas for purchase within 10 miles of a current location of the local computing device 54 for user X, who is identified as the decision maker. The formatting can be according to specific requirements of a search engine.

At 514, the configured processor submits the search to the search engine and receives the search results according to the submitted search.

At 516, the configured processor generates the overlay 424 or user interface display according to the received search results. The overlay 424 can be generated as a pop-up window or in-line display. In some embodiments, the configured processor generates a plurality of the overlays 424, each according to a user identifier of a corresponding local computing device 54.

The overlay 424 includes a ranking of the search results according to the determined relationship and the determined relationship strength. The ranking can be specific to the user identifier of the decision maker. In some embodiments, the rankings are specific to the user identifier of each user of the local computing devices 54.

At 518, the configured processor distributes the overlay 424 to the user interface of at least one of the computing devices. In some embodiments, the same overlay 424 is distributed to each computing device according to the application plug-in. For example, the overlay 424 includes rankings of the decision maker, which is shared with each member of the chat session 402. In some embodiments, different overlays 424 are distributed to the local computing devices 54, each according to the rankings specific to the user. For example, each user of the chat session 402 receives rankings according to their preferences. In some embodiments, the overlay 424 is displayed on a user interface of the local computing device 54. The display of the overlay 424 on the local computing device 54 can include scrolling for expanded viewing of the recommendations.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating chat session content, comprising executing on a computer processor:
    identifying a question in a text message of a chat session between a plurality of computing devices, wherein each of the plurality of computing devices includes an identifier of a user of a corresponding computing device in the text message;
    analyzing digital data to determine a relationship between the users of the plurality of computing devices;
    constructing search parameters for digital content external to the chat session according to the identified question and determined relationship;
    searching for the digital content over a network according to the constructed search parameters to obtain search results;
    ranking the search results according to the determined relationship;
    distributing the ranked search results according to the determined relationship to at least one of the plurality of computing devices in an overlay of the chat session;
    analyzing biometric data to determine states of mind for the users, wherein the biometric data is obtained from one or more devices selected from a group consisting of a smartwatch, a camera, and a microphone; and
    further constructing the search parameters for digital content external to the chat session according to the determined states of mind for the users, and
    wherein analyzing the digital data to determine the relationship between the users of the plurality of computing devices comprises analyzing digital data selected from a group consisting of relationship information in coded fields of social media data, discussion data of social media data, labeled image data of social media data, and text indicators of relationship information from text messages in the chat session or in prior chat sessions.

2. The method of claim 1, further comprising:
    analyzing text messages of the chat session to determine a sentiment value; and
    refining the search parameters for the digital content in response to the determined sentiment value.

3. The method of claim 1, wherein analyzing digital data includes identifying a decision maker from the users of the plurality of computing devices and a strength of the determined relationships between the users;
    wherein ranking the search results includes ranking the search results according to preferences of the decision maker and the strength of the determined relationships; and
    wherein distributing the ranked search results includes distributing the search results to the computing device of the decision maker.

4. The method of claim 1, wherein analyzing digital data includes identifying a strength of the determined relationships between the users;
    wherein ranking the search results includes a plurality of rankings, each ranking according to preferences of the user of a corresponding computing device and the strength of the determined relationships; and
    wherein distributing the ranked search results includes distributing the search results to each computing device with an overlay of one of the plurality of rankings corresponding to the preferences of the user of the corresponding computing device.

5. The method of claim 1, wherein the digital data comprises digital data selected from a group consisting of all text messages in the chat session, text messages in prior chat sessions, biometric data, calendar data, and social media data.

6. The method of claim 1, wherein the digital content is selected from a group consisting of events, activities, products, and services.

7. The method of claim 1, further comprising:
    integrating computer-readable program code into a computer system comprising a processor, a computer readable memory in circuit communication with the processor, and a computer readable storage medium in circuit communication with the processor; and
    wherein the processor executes program code instructions stored on the computer readable storage medium via the computer readable memory and thereby identifies a question in a text message of a chat session, analyzes prior digital data to determine a relationship between the users of the chat session, constructs search parameters for digital content external to the chat session, searches for digital content over a network, ranks the search results according to the determined relationship and displays the ranked search results in an overlay of the chat session, wherein the computer-readable program code is provided as a service in a cloud environment.

8. A system for generating chat session content, comprising:
   a computer processor;
   a computer readable memory in circuit communication with the computer processor; and
   a computer readable storage medium in circuit communication with the computer processor;
   wherein the computer processor executes program instructions stored on the computer readable storage medium via the computer readable memory and thereby:
   identifies a question in a text message of a chat session between a plurality of computing devices, wherein each of the plurality of computing devices includes an identifier of a user of a corresponding computing device in the text message;
   analyzes digital data to determine a relationship between the users of the plurality of computing devices;
   constructs search parameters for digital content external to the chat session according to the identified question and determined relationship;
   searches for the digital content over a network according to the constructed search parameters to obtain search results;
   ranks the search results according to the determined relationship;
   distributes the ranked search results according to the determined relationship to at least one of the plurality of computing devices in an overlay of the chat session;
   analyzes biometric data to determine states of mind for the users, wherein the biometric data is obtained from one or more devices selected from a group consisting of a smartwatch, a camera, and a microphone; and
   further constructs the search parameters for digital content external to the chat session according to the determined states of mind for the users, and
   wherein analyzing the digital data to determine the relationship between the users of the plurality of computing devices comprises analyzing digital data selected from a group consisting of relationship information in coded fields of social media data, discussion data of social media data, labeled image data of social media data, and text indicators of relationship information from text messages in the chat session or in prior chat sessions.

9. The system of claim 8, wherein the processor executes program instructions stored on the computer readable storage medium via the computer readable memory and thereby:
   analyzes text messages of the chat session to determine a sentiment value; and
   refines the search parameters for the digital content as a function of the determined sentiment value.

10. The system of claim 8, wherein the processor executes program instructions stored on the computer readable storage medium via the computer readable memory and thereby:
    identifies a decision maker from the users of the plurality of plurality of computing devices and a strength of the determined relationships between the users;
    ranks the search results according to preferences of the decision maker and the strength of the determined relationships; and
    distributes the search results to the computing device of the decision maker.

11. The system of claim 8, wherein the processor executes program instructions stored on the computer readable storage medium via the computer readable memory and thereby:
    ranks the search results with a plurality of rankings, each ranking according to preferences of the user of a corresponding computing device and the strength of the determined relationships; and
    distributes the search results to each computing device with an overlay of one of the plurality of rankings corresponding to the preferences of the user of the corresponding computing device.

12. The system of claim 8, wherein the digital data comprises digital data selected from a group consisting of all text messages in the chat session, text messages in prior chat sessions, biometric data, calendar data, and social media data.

13. The system of claim 8, wherein the digital content is selected from a group consisting of events, activities, products, and services.

14. A computer program product for generating chat session content, the computer program product comprising:
    a computer readable storage medium having computer readable program code embodied therewith, the computer readable program code comprising instructions for execution by a computer processor that causes the computer processor to:
    identify a question in a text message of a chat session between a plurality of computing devices, wherein each of the plurality of computing devices includes an identifier of a user of a corresponding computing device in the text message;
    analyze digital data to determine a relationship between the users of the plurality of computing devices;
    construct search parameters for digital content external to the chat session according to the identified question and determined relationship;
    search for the digital content over a network according to the constructed search parameters to obtain search results;
    rank the search results according to the determined relationship;
    distribute the ranked search results according to the determined relationship to at least one of the plurality of computing devices in an overlay of the chat session;
    analyze biometric data to determine states of mind for the users, wherein the biometric data is obtained from one or more devices selected from a group consisting of a smartwatch, a camera, and a microphone; and
    further construct the search parameters for digital content external to the chat session according to the determined states of mind for the users, and
    wherein analyzing the digital data to determine the relationship between the users of the plurality of computing devices comprises analyzing digital data selected from a group consisting of relationship information in coded fields of social media data, discussion data of social media data, labeled image data of social media data, and text indicators of relationship information from text messages in the chat session or in prior chat sessions.

15. The computer program product of claim 14, wherein the instructions for execution cause the computer processor to:
    analyze text messages of the chat session to determine a sentiment value; and
    refine the search parameters for the digital content as a function of the determined sentiment value.

16. The computer program product of claim 15, wherein the instructions for execution cause the computer processor to:

identify a decision maker from the users of the plurality of computing devices and a strength of the determined relationships between the users;

rank the search results according to preferences of the decision maker and the strength of the determined relationships; and distribute the search results to the computing device of the decision maker.

17. The computer program product of claim 14, wherein the instructions for execution cause the computer processor to:

rank the search results with a plurality of rankings, each ranking according to preferences of the user of a corresponding computing device and the strength of the determined relationships; and distribute the search results to each computing device with an overlay of one of the plurality of rankings corresponding to the preferences of the user of the corresponding computing device.

18. The computer program product of claim 14, wherein the digital data comprises digital data selected from a group consisting of all text messages in the chat session, text messages in prior chat sessions, biometric data, calendar data, and social media data, and wherein the digital content is selected from a group consisting of events, activities, products, and services.

* * * * *